United States Patent Office 3,187,327
Patented June 1, 1965

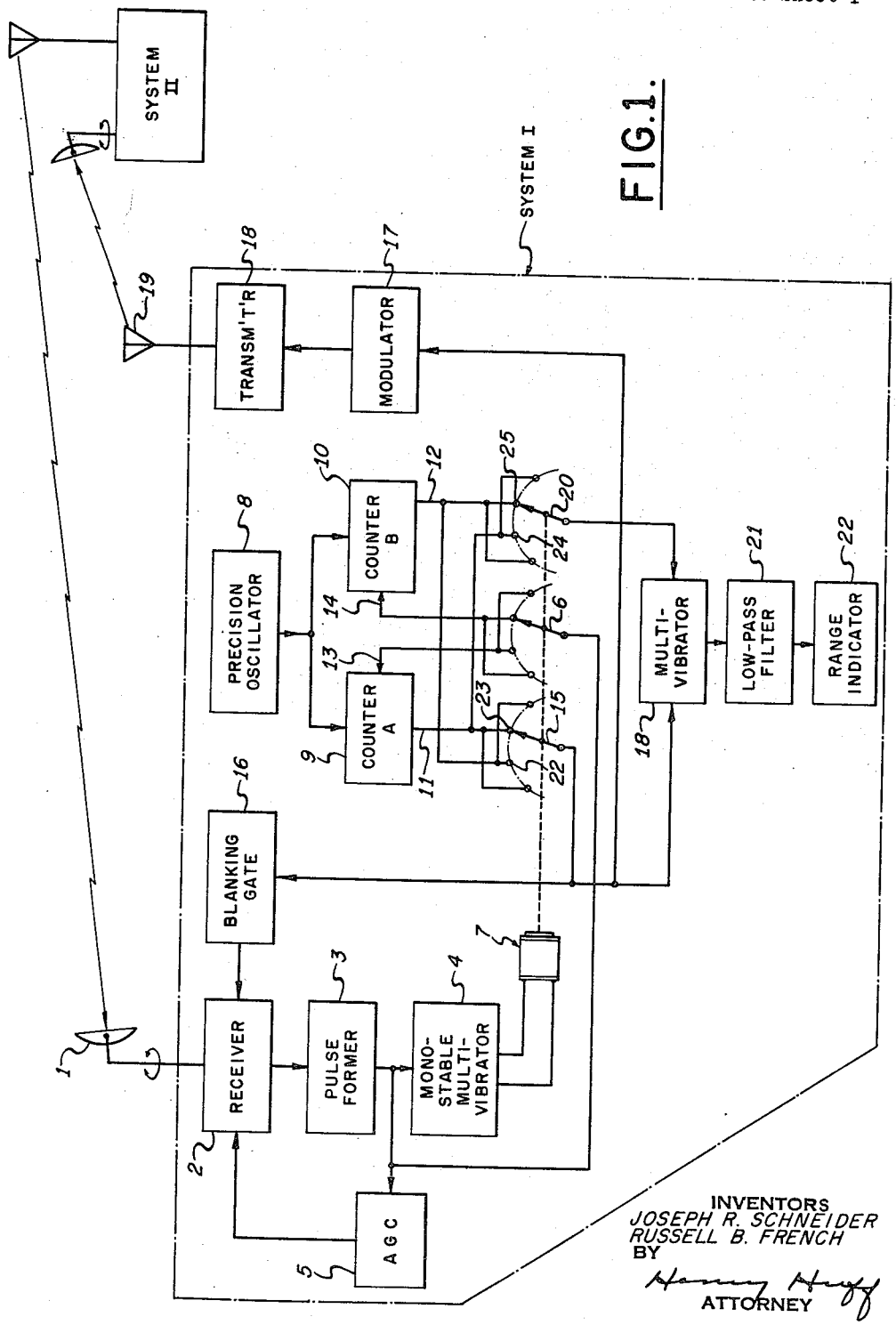

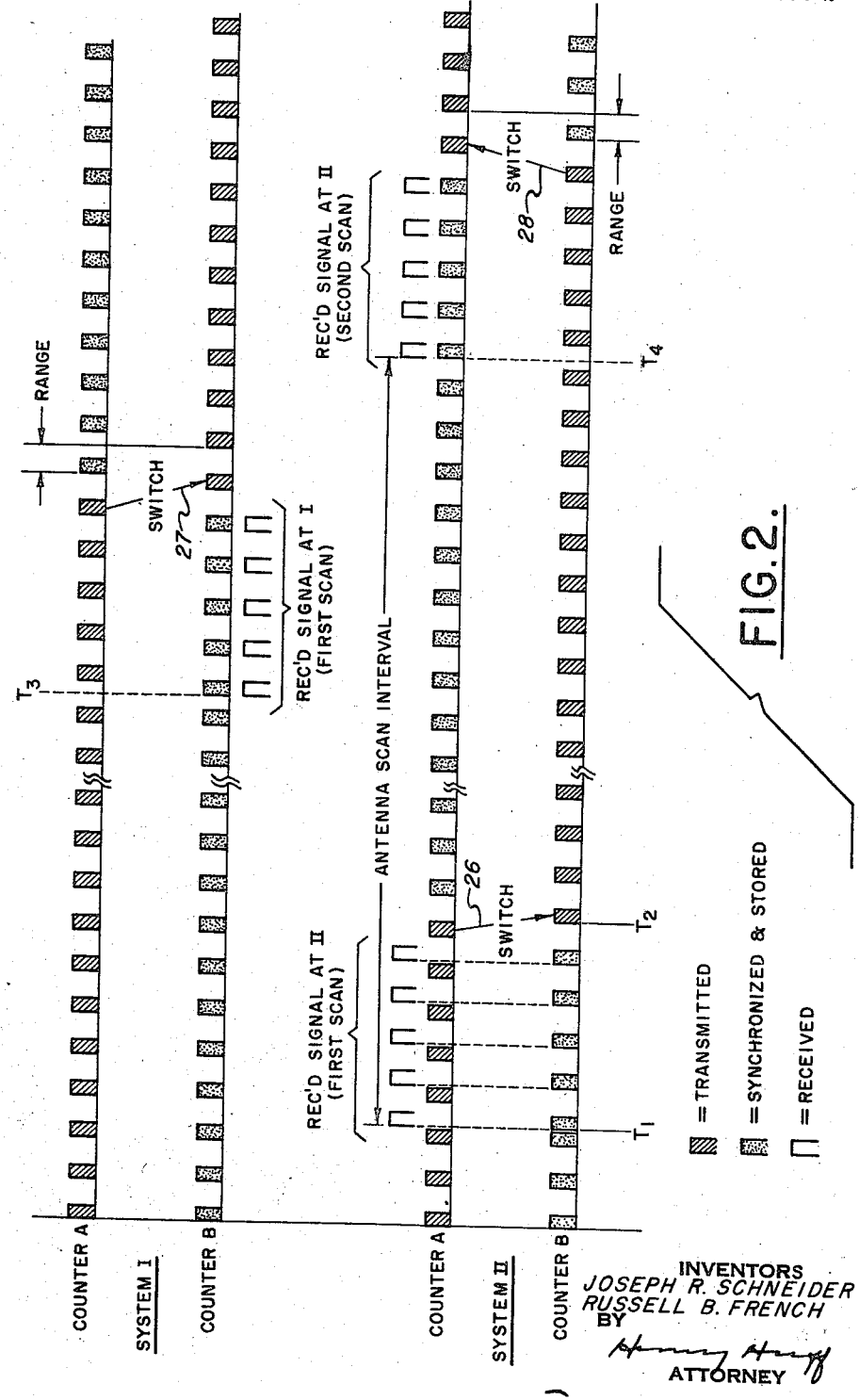

3,187,327
MULTIPLEX BEACON RANGE DETERMINING SYSTEM
Joseph R. Schneider, Larchmont, and Russell B. French, Plainview, N.Y., assignors to Sperry Rand Corporation, Great Neck, N.Y., a corporation of Delaware
Filed Dec. 14, 1959, Ser. No. 859,532
6 Claims. (Cl. 343—6.5)

The present invention relates to range determining systems and, more particularly, to a range determining system of the interrogator-beacon type which produces range information at both the locations of the interrogator and the beacon.

Range determination by the use of beacon techniques is well known in the art. One typical system includes a radar transmitter whose radiated microwave signal interrogates a remote beacon transponder. The time delay between the interrogating radar pulse and the beacon reply pulse is a measure of the distance separating the radar and the beacon. The time delay measurement, however, is made only at the location of the radar transmitter.

Occasionally, it is desired that range information be made available at both ends of the radar-beacon system. In aircraft traffic control situations, for example, it is advantageous that range information be available both at the aircraft and at the ground control land station. Such an objective has been achieved in the prior art by utilizing two independent radar interrogator-transponder systems. Thus, range information is made available at both the aircraft and land station only at the expense of a two-fold increase in apparatus.

A principal object of the present invention is to provide a range determining system of the radio beacon type requiring a minimum of components.

Another object is to provide a radio range determining system of the interrogator-beacon type wherein range information is available at both the interrogator and transponder.

These and other objects of the present invention, as will appear more fully upon a reading of the following specification, are achieved in a preferred embodiment by the provision of a pair of identical equipments. Each equipment is located at a respective one of the points between which range is to be determined. Each equipment essentially includes an omni-directional transmitting antenna and a continuously scanning directional receiving antenna. A first source of locally generated pulses actuates the transmitter. A second source of locally generated pulses, having the same frequency as that of the first source, is synchronized to the received pulses. Range is determined by measuring the time delay between the pulses of the first and second local sources.

Range information is produced in both of the aforementioned identical equipments by means of a switching arrangement which interchanges the functions of the first and second local sources of pulses. Each time that pulses are received by the scanning receiving antenna, an alternate one of the local pulse sources is synchronized to the received pulses. A predetermined time thereafter, the synchronized local pulse source is utilized to actuate the transmitter. The effect is that each of the identical equipments simultaneously serves the dual purposes of interrogating and responding to the other equipment.

For a more complete understanding of the present invention, reference should be had to the following specification and to the drawings of which:

FIG. 1 is a block diagram of a preferred embodiment of one of the two identical equipments utilized by the invention; and FIG. 2 is a series of idealized pulse diagrams useful in explaining the operation of the apparatus of FIG. 1.

The range determining system of the present invention utilizes two identical equipments which are designated by the legends "System I" and "System II" in FIG. 1. For example, System I may be located board an aircraft while System II is situated at a ground station. The purpose of the system is to display the range separating the aircraft and the ground station at both locations.

Incoming pulses of electromagnetic energy are received by antenna 1, detected in receiver 2 and applied to pulse former 3. Pulse former 3 produces a pulse of predetermined amplitude and duration in response to each of the detected pulses at the output of receiver 2. The pulses at the output of pulse former 3 are applied jointly to monostable multivibrator 4, automatic gain control circuit 5 and movable contact 6 of stepping relay 7.

The incoming pulses are received by rotating directional antenna 1 each time that antenna 1 scans through the bearing of the incoming signals. The repetition rate of the received pulses is predetermined. Consequently, a group of pulses is received by antenna 1 once each scanning cycle. The number of pulses present in each group is determined by the fixed repetition rate of the incoming signals, the fixed azimuth scanning rate of antenna 1, the beam pattern of antenna 1, the distance separating antenna 1 from the source of the incoming signals and the sensitivity of receiver 1. It will be seen that as the distance separating the source of incoming pulses and antenna 1 decreases, the number of pulses in each group of received pulses ordinarily will increase for a given antenna beam pattern. This is true because the number of incoming pulses which exceeds the amplitude of detectability increases with a decrease in the distance separating the source of the incoming pulses and antenna 1.

The purpose of automatic gain control circuit 5 is to maintain relatively constant the number of pulses in each group of pulses at the output of pulse former 3 irrespective of amplitude variations of the incoming signals attributable to range changes between the source of the incoming pulses and antenna 1. An automatic gain control bias is generated within circuit 5 in proportion to the number of pulses in each pulse group which is in excess of a predetermined number. Such a circuit is catagorized in the art as a delayed automatic gain control circuit because of its ability to maintain receiver output at a preestablished level without effecting receiver gain before said level is reached. A typical gain control circuit suitable for use in the present invention is described in copending patent application S.N. 847,777, filed on October 21, 1959, in the name of Warren M. Macek, now U.S. Patent No. 3,077,597, and assigned to the present assignee.

The basic timing standard for the operation of the apparatus of FIG. 1 is provided by precision oscillator 8 which preferably is crystal controlled. The output signal of oscillator 8 is applied jointly to counters 9 and 10 which produce an output lines 11 and 12, respectively, a series of pulses having the same repetition rate which is a predetermined fraction of the frequency of oscillator 8. Each of counters 9 and 10 are adapted by means of reset lines 13 and 14, respectively, to be reset and to produce an output pulse in response to each pulse applied via movable contact 6 of stepping relay 7. In the position of movable contact 6 as shown in FIG. 1, counter 10 is reset in response to each output pulse from former 3. As will be seen more fully later, the recurrence rate of the output pulses of counters 9 and 10 is equal to the repetition rate of the incoming pulses received by antenna 1.

Stepping relay 7 is actuated to advance one contact position each time that a group of pulses is produced at the output of pulse former 3. The actuation is delayed by multivibrator 4 to occur immediately after the last pulse of said group. This can be accomplished by the typical design technique of adjusting the resetting time of multivibrator 4 to be slightly greater than the time interval of the pulse group and by triggering the stepping relay concurrently with the trailing edge of the multivibrator output waveform. The time interval of the pulse group is predetermined by the known repetition interval of the pulses within each group and the fixed number of pulses comprising each group as established by the aforementioned operation of AGC circuit 5.

In the position shown for movable contact 15 of stepping relay 7, the output pulses of counter 9 are applied jointly to blanking gate 16, modulator 17 and the "off" input terminal of multivibrator 18. The pulses which are applied to modulator 17 actuate transmitter 18 for the radiation of electromagnetic pulses by omnidirectional antenna 19. The same pulses which actuate modulator 17 also activate blanking gate 16. Gate 16 produces an output signal which renders receiver 2 inoperative for the time intervals during which pulses are radiated by antenna 19.

The output pulses of counter 10 are applied via movable contact 20 (in the position shown) of stepping relay 7 to the "on" input terminal of multivibrator 18. Multivibrator 18 is placed into a predetermined one of the stable states by each output pulse from counter 10 and is placed into the other of its stable states by the next following output pulse from counter 9. Thus, the duration of the output waveform of multivibrator 18 is a measure of the time separation between corresponding ones of the output pulses of counters 10 and 9. The output waveform is applied to low-pass filter 21 which extracts the D.C. component for application to range indicator 22. Range indicator 22 may be simply a direct current voltmeter calibrated in terms of the range separating the source of the incoming pulses and antenna 1.

The over-all range determining system of FIG. 1 consists of System I and System II. It will be recalled that System II is identical to System I. The predetermined repetition rate pulses of counter A of System I are transmitted by the omnidirectional antenna of System I and are received by the rotating directional antenna of System II each time that said antenna of System II scans through the azimuth of the incoming pulses received from System I. The pulses received by System II reset counter B of System II (corresponding to counter 10 of System I) causing the output pulses of counter B of System II to be synchronized with the pulses received from System I. This will be shown more clearly in the ensuing description of the pulse diagrams of FIG. 2.

Each actuation of stepping relay 7 causes ganged movable members 15, 6 and 20 to reverse the functions of counters A and B. The functions alternately assumed by counters A and B are represented respectively by the crosshatching and stippling of the individual pulses represented in FIG. 2. The crosshatching indicates that the corresponding pulses are those which actuate the transmitter. The stippling indicates that the corresponding pulses are those which have been synchronized to the last received signals but which are not presently actuating the transmitter. For the sake of explanation, the initial pulses of counters A and B of System I are shown in FIG. 2 as occurring synchronously in time. Assuming the position of movable members 15, 6 and 20 shown in FIG. 1, the output pulses of counter A actuate transmitter 18. Accordingly, the pulses of counter A (System I) are shown crosshatched in FIG. 2. Correspondingly, the pulses of counter B (System I) are shown stippled.

The transmitted pulses A of System I are received in System II when the directional antenna of System II scans by the azimuth of the incoming pulses from System I. This occurs at time $T_1$. Five pulses (unshaded) are received by System II during the first scan. As previously explained, the AGC circuit of System II (similar to AGC 5 of System I) maintains the number of pulses in the group constant despite variations in the distance separating Systems I and II. A five pulse group is shown by way of example.

Immediately upon reception of the first of the group of five pulses by System II, counter B of System II is synchronized thereto. It is assumed that the movable members of the System II stepping relay are in the same position as shown in FIG. 1 for System I. Thus, the pulses of counter B, System II, are synchronized with each of the group of pulses received from System I. A predetermined time thereafter, determined by the resetting time of monostable multivibrator (corresponding to multivibrator 4 of System I) the stepping relay of System II is energized causing the pulses of counter B to actuate the transmitter of System II. The predetermined time delay is made as short as possible while still being sufficiently long to prevent a second actuation of the stepping relay during the reception of the same group of pulses. At this point ($T_2$), the pulses being radiated by System II are phase locked to those received from System I, the time separation between the two being solely a function of the range separating the two systems which is to be determined.

At a later time ($T_3$), the scanning antenna of System I will traverse the azimuth of the incoming pulses now being received from System II. This is shown in the unshaded pulses designating the received signals at I (first scan). Said received group of pulses immediately synchronizes the pulses of counter B of System I. A predetermined time thereafter stepping relay 7 of System I is energized causing the System I transmitter to be actuated by the pulses of counter B rather than the pulses of counter A. The point at which the switching takes place is represented by the arrow 27 designated "switch." Immediately after the last-named switching operation, range information is available in System I by measuring the time separation between the pulses which then appear at the output of counters A and B in System I. This range measurement is accomplished by means of multivibrator 18, filter 21 and indicator 22 as previously described.

It should be noted that although the synchronized pulses of counter B, System I, at time $T_3$ contain range information from the point of view of System I, they are also synchronized to the last group of pulses received from System II. It therefore follows that the same synchronized pulses of counter B of System I not only represent the reply of System II to the previous interrogation by System I but, at the same time, represent the present reply by System I to the immediately preceding interrogation by System II. In other words, the group of five pulses designated "received signal at I (first scan)" simultaneously represents both a replay by System II to System I and a reply by System I to System II.

Signals synchronized to the pulses of counter B of System I are received by System II the next time ($T_4$) that the rotating directional antenna of System II scans through the azimuth of System I. The received group of pulses is represented by the legend "received signal at II (second scan)." It will be recalled that when the second scan pulses are received from System I, the stepping relay of System II is in a position opposite to the one shown in FIG. 1. Therefore, the pulses of counter A of System II are synchronized to the received group of pulses as indicated in FIG. 2. A predetermined time thereafter, as indicated by arrow 28, the pulses of counter A, System II, are selected to actuate the transmitter of System II. Immediately subsequent to the last-named switching operation range information is available at System II by measuring the difference in time between the pulses of counters B and A in System II. It is to be understood that the sequence of successive synchronization represented in FIG. 2 continues indefinitely.

It should be noted that accurate range measurement is available in Systems I and II during a major portion of the antenna scanning intervals inasmuch as the outputs of counters A and B are continuously applied to their respective range determining multivibrator such as multivibrator 18 of FIG. 1. The range measurement is subject to a brief and inconsequential interruption during the period between the arrival of the first of a group of received pulses and the subsequent actuation of the stepping relay. In a representative case, however, the antenna scanning interval may be of the order of three seconds whereas the disturbance attributable to resynchronization may be of the order of less than .2 of a second. The disturbance will be manifested merely by a brief deflection in the presentation of the range indicator such as indicator 22 of FIG. 1. The brief deflection, in turn, may be easily recognized and ignored.

It will be seen from the preceding specification that the objects of the present invention have been achieved through the use of first and second local oscillators (represented by counters A and B, respectively) in each of Systems I and II. At any given time, one of the local oscillators is being used to actuate the transmitter whereas the other local oscillator is storing information respecting the phase of the last group of received pulses. The storing and transmitter actuating functions of the two local oscillators is interchanged subsequent to each reception of a group of pulses. By continuously measuring the time separation between the pulses produced by the two local sources, range information is made available simultaneously in both Systems I and II.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:
1. Beacon apparatus comprising
first and second sources of repetitive pulses,
first means for synchronizing the pulses of said first source,
second means for synchronizing the pulses of said second source,
pulse transmitting means,
pulse receiving means,
coupling means connected to both said synchronizing means, to said transmitting means and to said receiving means, said coupling means having two modes of operation,
said coupling means in one mode applying received pulses to said first synchronizing means to synchronize the pulses of said first source with said received pulses and applying the pulses of said second source to said pulse transmitting means,
said coupling means in the other mode applying received pulses to said second synchronizing means to synchronize the pulses of said second source with said received pulses and applying the pulses of said first source to said pulse transmitting means,
and means connected to said pulse receiving means and to said coupling means for changing the operation of said coupling means from one of said modes to the other of said modes in response to said received pulses.

2. Beacon apparatus comprising
first and second sources of repetitive pulses,
first means for synchronizing the pulses of said first source,
second means for synchronizing the pulses of said second source,
pulse transmitting means,
pulse receiving means,
coupling means connected to both said synchronizing means, to said transmitting means and to said receiving means, said coupling means having two modes of operation,
said coupling means in one mode applying received pulses to said first synchronizing means to synchronize the pulses of said first source with said received pulses and applying the pulses of said second source to said pulse transmitting means,
said coupling means in the other mode applying received pulses to said second synchronizing means to synchronize the pulses of said second source with said received pulses and applying the pulses of said first source to said pulse transmitting means,
means connected to said pulse receiving means and to said coupling means for changing the operation of said coupling means from one of said modes to the other of said modes in response to received pulses,
and means connected to said first and second sources for measuring the time difference between the occurrences of the respective pulses produced thereby.

3. Beacon apparatus comprising
first and second sources of repetitive pulses,
first means for synchronizing the pulses of said first source,
second means for synchronizing the pulses of said second source,
means including an omnidirectional antenna for transmitting pulses,
means including a continuously scanning directional antenna for receiving groups of pulses, said groups recurring at the scanning rate of said directional antenna, and the pulses comprising each group recurring at the same repetition rate as that of the pulses produced by said first and second sources,
coupling means connected to both said synchronizing means, to said transmitting means and to said receiving means, said coupling means having two modes of operation,
said coupling means in one mode applying received pulses to said first synchronizing means to synchronize the pulses of said first source with said received pulses and applying the pulses of said second source to said pulse transmitting means,
said coupling means in the other mode applying received pulses to said second synchronizing means to synchronize the pulses of said second source with said received pulses and applying the pulses of said first source to said pulse transmitting means,
and means connected to said receiving means and to said coupling means for changing the operation of said coupling means from one of said modes to the other of said modes in response to said received pulses.

4. Beacon apparatus comprising,
first and second sources of repetitive pulses,
first means for synchronizing the pulses of said first source,
second means for synchronizing the pulses of said second source,
means including an omnidirectional antenna for transmitting pulses,
means including a continuously scanning directional antenna for receiving groups of pulses, said groups recurring at the scanning rate of said directional antenna, and the pulses comprising each group recurring at the same repetition rate as that of the pulses produced by said first and second sources,
means connected to both said synchronizing means, to said transmitting means and to said receiving means, said coupling means having two modes of operation,
said coupling means in one mode applying received pulses to said first synchronizing means to synchronize the pulses of said first source with said received pulses and applying the pulses of said second source to said pulse transmitting means, said coupling means in the other mode applying received pulses to said second synchronizing means to synchronize the pulses of said second source with said received pulses and applying the pulses of said first source to said pulse tranmitting means, means connected to said receiving means and to said coupling means for changing the operation of said coupling means from one of said modes to the other of said modes in response to said received pulses, and means connected to said first and second sources for measuring the time difference between the occurrences of the respective pulses produced thereby.

5. A multiplex beacon range determining system comprising first and second spacially separated equipments, each equipment comprising first and second sources of repetitive pulses, first means for synchronizing the pulses of said first source, second means for synchronizing the pulses of said second source, pulse transmitting means, pulse receiving means, coupling means connected to both said synchronizing means, to said transmitting means and to said receiving means, said coupling means having two modes of operation, said coupling means in one mode applying received pulses to said first synchronizing means to synchronize the pulses of said first source with said received pulses and applying the pulses of said second source to said pulse transmitting means, said coupling means in the other mode applying received pulses to said second synchronizing means to synchronize the pulses of said second source with said received pulses and applying the pulses of said first source to said pulse transmitting means, means connected to said pulse receiving means and to said coupling means for changing the operation of said coupling means from one of said modes to the other of said modes in response to received pulses, and means connected to said first and second sources for measuring the time difference between the occurrences of the respective pulses produced thereby.

6. A multiplex beacon range determining system comprising first and second spacially separated equipments, each equipment comprising first and second sources of repetitive pulses, first means for synchronizing the pulses of said first source, second means for synchronizing the pulses of said second source, means including an omnidirectional antenna for transmitting pulses, means including a continuously scanning directional antenna for receiving groups of pulses, said groups recurring at the scanning rate of said directional antenna, and the pulses comprising each group recurring at the same repetition rate as that of the pulses produced by said first and second sources, means connected to both said synchronizing means, to said transmitting means and to said receiving means, said coupling means having two modes of operation, said coupling means in one mode applying received pulses to said first synchronizing means to synchronize the pulses of said first source with said received pulses and applying the pulses of said second source to said pulse transmitting means, said coupling means in the other mode applying received pulses to said second synchronizing means to synchronize the pulses of said second source with said received pulses and applying the pulses of said first source to said pulse transmitting means, means connected to said receiving means and to said coupling means for changing the operation of said coupling means from one of said modes to the other of said modes in response to said received pulses, and means connected to said first and second sources for measuring the time difference between the occurrences of the respective pulses produced thereby.

References Cited by the Examiner
UNITED STATES PATENTS

| | | | |
|---|---|---|---|
| 2,705,794 | 4/55 | Sunstein | 343—13 |
| 2,857,592 | 10/58 | Hoffman | 343—13 |

CHESTER L. JUSTUS, *Primary Examiner.*

FREDERIK M. STRADER, *Examiner.*